United States Patent
Ross et al.

(10) Patent No.: US 7,711,358 B2
(45) Date of Patent: *May 4, 2010

(54) METHOD AND SYSTEM FOR MODIFYING NAMETAG FILES FOR TRANSFER BETWEEN VEHICLES

(75) Inventors: Steven J. Ross, Livonia, MI (US); Rathinavelu Chengalvarayan, Naperville, IL (US); Christopher L. Oesterling, Troy, MI (US)

(73) Assignee: General Motors LLC, Detroit, MI (US)

( * ) Notice: Subject to any disclaimer, the term of this patent is extended or adjusted under 35 U.S.C. 154(b) by 1345 days.

This patent is subject to a terminal disclaimer.

(21) Appl. No.: 11/168,583

(22) Filed: Jun. 28, 2005

(65) Prior Publication Data

US 2006/0149457 A1    Jul. 6, 2006

Related U.S. Application Data

(63) Continuation-in-part of application No. 11/014,497, filed on Dec. 16, 2004, now Pat. No. 7,596,370.

(51) Int. Cl.
| | |
|---|---|
| G10L 21/00 | (2006.01) |
| H04M 1/64 | (2006.01) |
| H04M 11/00 | (2006.01) |
| H04M 3/42 | (2006.01) |
| H04M 3/00 | (2006.01) |
| H04M 1/00 | (2006.01) |
| G05D 11/00 | (2006.01) |
| G01C 22/00 | (2006.01) |
| H04W 4/00 | (2006.01) |
| H04B 1/38 | (2006.01) |

(52) U.S. Cl. .......... 455/418; 704/270; 704/270.1; 704/275; 379/88.01; 379/88.05; 701/1; 701/24; 701/200; 455/408; 455/409; 455/414.1; 455/414.2; 455/432.3; 455/563; 455/569.1; 455/569.2; 455/419; 455/420

(58) Field of Classification Search ........... 704/270, 704/275, 270.1; 379/88.01, 88.05; 701/1, 701/24, 200; 455/408, 409, 414.1–414.3, 455/432.2, 432.3
See application file for complete search history.

(56) References Cited

U.S. PATENT DOCUMENTS

| | | | | |
|---|---|---|---|---|
| 5,802,460 | A  * | 9/1998 | Parvulescu et al. | 455/92 |
| 6,085,160 | A  * | 7/2000 | D'hoore et al. | 704/256.2 |
| 6,157,321 | A  * | 12/2000 | Ricci | 340/902 |
| 6,505,780 | B1 | 1/2003 | Yassin et al. | |
| 6,556,971 | B1 * | 4/2003 | Rigsby et al. | 704/270 |
| 6,819,759 | B1 * | 11/2004 | Khuc et al. | 379/309 |
| 6,987,964 | B2 * | 1/2006 | Obradovich et al. | 455/414.1 |
| 7,050,834 | B2 * | 5/2006 | Harwood et al. | 455/563 |
| 7,245,905 | B2 * | 7/2007 | Kamdar et al. | 455/418 |
| 7,319,742 | B2 * | 1/2008 | Levine | 379/88.18 |
| 7,352,848 | B2 * | 4/2008 | Stillman et al. | 379/88.03 |

(Continued)

Primary Examiner—David R Hudspeth
Assistant Examiner—Paras Shah
(74) Attorney, Agent, or Firm—Dierker & Associates, P.C.

(57) ABSTRACT

A method for managing user nametags for a vehicle communications system includes receiving a nametag transfer request at a call center from a source, determining a target vehicle based on the request, generating a nametag data file including a text data file, a phoneme set, and an audio data file for each nametag, and transmitting the nametag data file to the target vehicle.

19 Claims, 11 Drawing Sheets

U.S. PATENT DOCUMENTS

| | | |
|---|---|---|
| 7,516,072 B2 * | 4/2009 | Campbell et al. ............ 704/270 |
| 7,533,023 B2 * | 5/2009 | Veprek et al. ............ 704/270.1 |
| 2002/0013707 A1 * | 1/2002 | Shaw et al. ................. 704/257 |
| 2002/0118803 A1 * | 8/2002 | Mahoney ................. 379/88.03 |
| 2002/0197988 A1 * | 12/2002 | Hellaker ..................... 455/423 |
| 2002/0198632 A1 * | 12/2002 | Breed et al. ..................... 701/1 |
| 2003/0050779 A1 * | 3/2003 | Riis et al. .................. 704/236 |
| 2003/0144005 A1 * | 7/2003 | Videtich ..................... 455/456 |
| 2004/0002359 A1 * | 1/2004 | Deas et al. ................ 455/556.2 |
| 2004/0037399 A1 * | 2/2004 | Manohar ................. 379/88.03 |
| 2004/0162064 A1 * | 8/2004 | Himmelstein ............ 455/422.1 |
| 2004/0219954 A1 * | 11/2004 | Odinak ..................... 455/569.1 |
| 2006/0149457 A1 * | 7/2006 | Ross et al. ................... 701/117 |
| 2006/0217109 A1 * | 9/2006 | Sobb et al. ................ 455/414.1 |
| 2007/0124046 A1 * | 5/2007 | Ayoub et al. .................. 701/36 |
| 2008/0015771 A1 * | 1/2008 | Breed et al. ................. 701/207 |

\* cited by examiner

METHOD AND SYSTEM FOR MODIFYING NAMETAG FILES FOR TRANSFER BETWEEN VEHICLES

RELATED APPLICATIONS

This is a continuation-in-part application of application Ser. No. 11/014,497 filed on Dec. 16, 2004, now U.S. Pat. No. 7,596,370 the entirety of which is incorporated by reference.

FIELD OF THE INVENTION

This invention relates generally to a method of managing nametag data files for speech recognition embedded in a vehicle communication system. In particular, the invention relates to transfer of nametag data files for speech recognition from one vehicle to another vehicle.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics units in mobile vehicles establish a communication channel between an in-vehicle mobile phone and a receiver phone responsive to a user speaking a nametag to identify the phone number of the receiver phone. A user programs the nametags and the related phone numbers into the telematics unit from inside the vehicle. A user can also program the nametags and the related phone numbers into the in-vehicle mobile phone or a personal mobile phone.

The telematics unit and the mobile phone include an automated speech recognition (ASR) engine to correlate the spoken nametag with a plurality of phoneme sets. When a user buys a new vehicle with an embedded telematics unit the user generally wants to have some or all of the nametags from the initial vehicle in the new vehicle. Currently, the user must be in the new vehicle to input the list of nametags from the previous vehicle into the new vehicle for recognition by the ASR engine. Likewise, if a user buys a new vehicle with a telematics unit and wants to have the nametags from a mobile phone in the new vehicle, the user must be in the new vehicle to input the list of nametags from the mobile phone into the new vehicle for recognition by the ASR engine.

It is desirable to transfer the nametags from the initial vehicle, a website or a mobile phone to the new vehicle without requiring the user to be in the new vehicle and without requiring the user needing to recall all the nametags in the initial vehicle or mobile phone.

SUMMARY OF THE INVENTION

One aspect of the present invention provides a method for managing user nametags for a vehicle communications system. The method includes receiving a nametag transfer request at a call center from a source, determining a target vehicle based on the request, generating a nametag data file, and transmitting the nametag data file to the target vehicle. The nametag data file includes a text data file, a phoneme set, and an audio data file for each nametag.

A second aspect of the present invention provides a system for managing user nametags for a vehicle communications system. The system includes means for receiving a nametag transfer request at a call center from a source, means for determining a target vehicle based on the request, means for generating a nametag data file including a text data file, a phoneme set, and an audio data file for each nametag, and means for transmitting the nametag data file to the target vehicle.

A third aspect of the present invention provides a computer readable medium storing a computer program. The computer readable code receives a nametag transfer request at a call center from a source, determines a target vehicle based on the request, generates a nametag data file, transmits the nametag data file to the target vehicle and stores the nametag data file at a telematics unit of the target vehicle. The nametag data file includes a text data file, a phoneme set, and an audio data file for each nametag.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
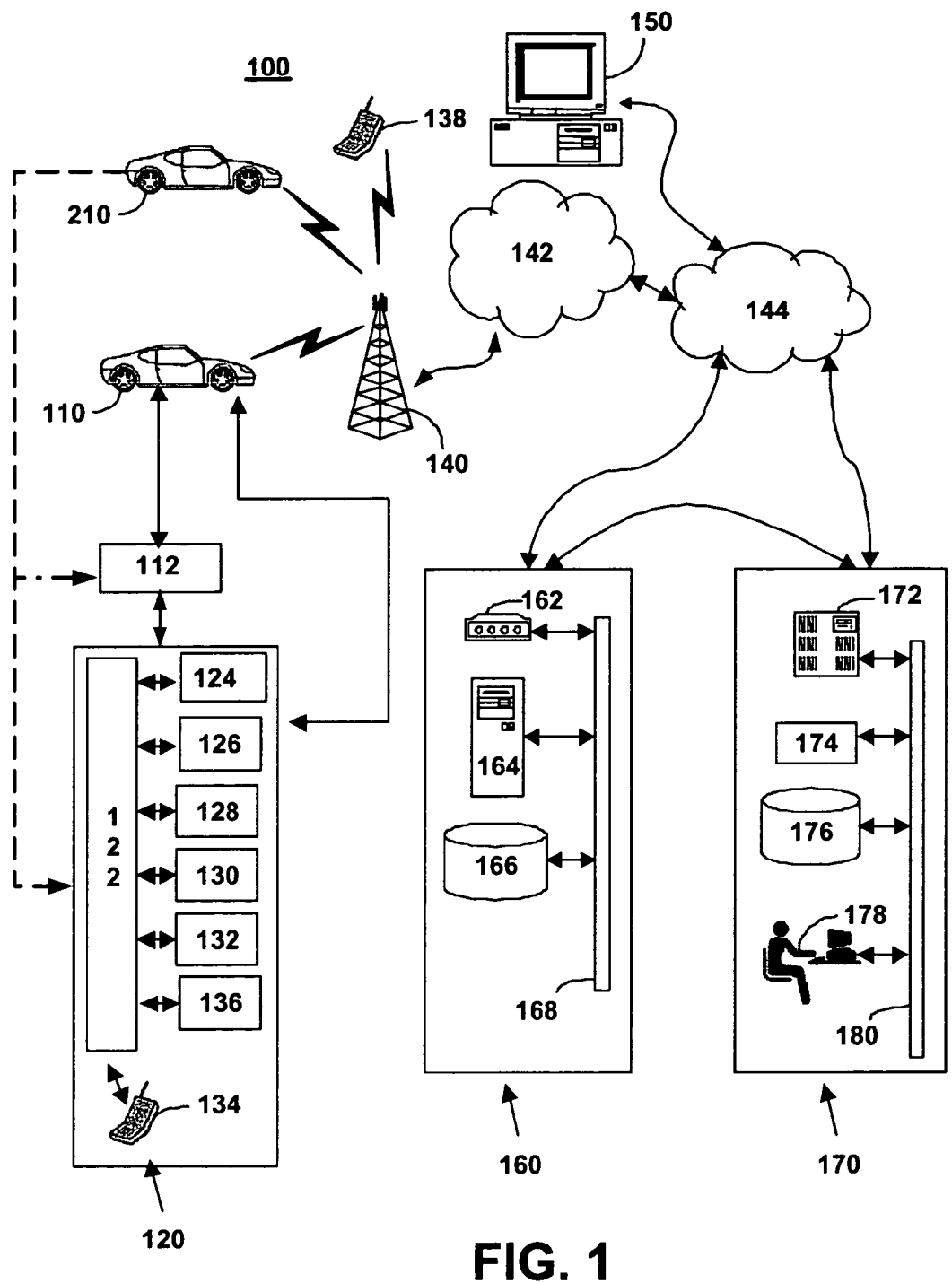
FIG. 1 is a schematic diagram of a system for providing access to a telematics system in mobile vehicles.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a MVCU 210, a vehicle communication network 112, a telematics unit 120, one or more wireless carrier systems 140, one or more communication networks 142, one or more land networks 144, one or more client, personal or user computers 150, one or more web-hosting portals 160, one or more personal communication devices 138, and/or one or more call centers 170. The MVCU 210 has a telematics unit 120 including the functionality of the telematics unit 120 in the source vehicle 110.

In one embodiment, MVCU 110 and MVCU 210 are implemented as mobile vehicles equipped with suitable hardware and software for transmitting and receiving voice and data communications. MVCS 100 may include additional components not relevant to the present discussion. Mobile vehicle communication systems and telematics units are known in the art. The term "MVCU 210" and "target vehicle 210" are used interchangeably throughout this document. Throughout this document, the term "MVCU 110" and "source vehicle 110" are used interchangeably.

In operation, MVCU 110 and MVCU 210 may be implemented as motor vehicles, marine vehicles, or as aircraft. MVCU 110 and MVCU 210 may include additional components not relevant to the present discussion.

For the remainder of the discussion of FIG. 1, a reference to MVCU 110 is a reference to both MVCU 110 and MVCU 210. In one embodiment, MVCU 110 and MVCU 210 differ only in their acoustic characteristics and in the installed version of one or more automatic speech recognition (ASR) engines in a speech recognition system 136 in the telematics unit 120. The ASR engines in MVCU 110 and MVCU 210 translate human voice input through microphone 130 to digital signals that represent a phoneme sets. The ASR engines in MVCU 110 and MVCU 210 also recognize phoneme sets and generate digital signals that generate acoustic waves when received at one or more speakers 132 in the telematics unit 120. The functions of the telematics unit in the target vehicle 210 are the same as the functions of the telematics unit 120 of the source vehicle 110 and are described herein as if the telematics unit 120 is in the target vehicle 210 as indicated by the dashed line connecting the target vehicle 210 to the telematics unit 120 and vehicle communication network 112.

In one embodiment, MVCU 110 and MVCU 210 have the same acoustic characteristics. In another embodiment, MVCU 110 and MVCU 210 have the same installed version of an ASR engine. In yet another embodiment, MVCU 110 and MVCU 210 have the same acoustic characteristics and the same installed version of an ASR engine.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an in-vehicle mobile phone 134. In other embodiments, telematics unit 120 may be implemented without one or more of the above listed components, such as, for example, a GPS unit 126. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type communication device, such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application including one or more ASR engine is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from processor 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. Communication services manager 174 includes, in one embodiment, at least one analog and/or digital modem.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

A personal communication device 138 includes nametag data files as either text data files or audio data files. Personal communication device 138 is implemented as any communication device configured to be transportable, such as a mobile phone, laptop, or a personal digital assistant (PDA). The personal communication device 138 is in communication with the call center 170 via one or more wireless carrier systems 140, one or more communication networks 142, one or more land networks 144, one or more client, personal or user computers 150, and one or more web-hosting portals 160. In-vehicle mobile phone 134 is a cellular-type communication device, such as, for example, an analog, digital, dual-mode, dual-band, multi-mode or multi-band cellular phone.

The methods 200-1400 described below with reference to FIGS. 2-14, respectively, together form one embodiment of a complete method for managing user nametags for a vehicle communication system. The method describes how to generate a nametag data file including a text data file, a phoneme set and an audio data file and how to transfer the generated nametag data file from a source to a target vehicle that has different acoustic characteristics. The transfer includes modifying the acoustic characteristics of the phoneme sets in the nametag data file as appropriate. The acoustic modification enhances the recognition capability of a speech recognition system 136 in the target vehicle 210 when a user announces nametags in the target vehicle 210. In methods 200-1400 all the transmissions between the call center 170 and the telematics unit 120 in either the target vehicle 210 or the source vehicle 110 are transmitted via one or more wireless carrier systems 140, one or more communication networks 142, one or more land networks 144. In methods 200-1400 all the transmissions between the call center 170 and a personal or user computer 150 and/or personal communication device 138 are transmitted via one or more wireless carrier systems 140, one or more communication networks 142, one or more land networks 144, one or more client, personal or user computers 150, one or more web-hosting portals 160.

Figure 2:
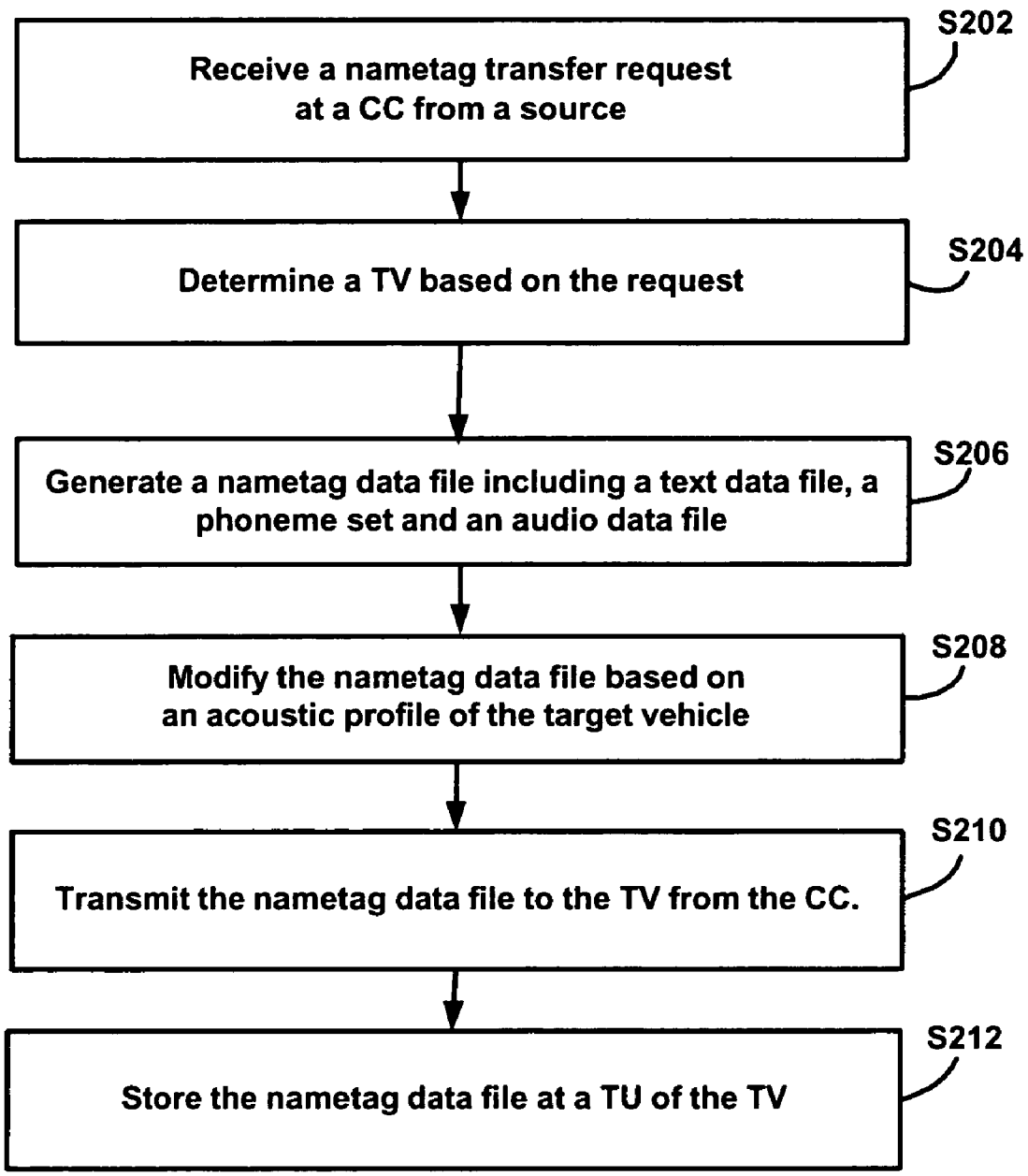
FIG. 2 illustrates a method of managing user nametags for a vehicle communications system in accordance with the present invention.

FIG. 2 illustrates a method 200 of managing user nametags for a mobile vehicle communications system 100 in accordance with the present invention. The call center 170, the target vehicle 210, the telematics units 120, the processor 122, and the source, such as the MVCU 110, the in-vehicle mobile phone 134, the personal communication device 138, and/or the client, personal or user computer 150 have stored in computer readable medium at least one computer program including computer readable code to perform the operations described with reference to method 200.

During stage S202, the call center (CC) 170 receives a nametag transfer request from a source. The source can be the MVCU 110, the personal communication device 138, the in-vehicle mobile phone 134, or a client, personal or user computer 150.

In one embodiment, the nametag data file is downloaded from a personal communication device 138 into a client, personal or user computer 150 and the nametag transfer request including the nametag data file is transmitted to the call center 170 from the client, personal or user computer 150. In one example, the primary source is the personal communication device 138 and a secondary source is the client, personal or user computer 150.

The nametag transfer request includes at least a selection of nametag data files to be transferred, a source identifier, and a target vehicle identifier. In one embodiment, each nametag in the nametag data file selected for transfer to the target vehicle 210 includes a correlated audio data file, phoneme set and text data file. In another embodiment in which the source is entered at a client, personal or user computer 150, the entered nametags and correlated phone numbers are text data files. In that case, the source identifier is an identifier for the client, personal or user computer 150. In yet another embodiment in which the source is input from a telematics unit 120, the phone numbers and nametags that form the nametag data file are audio data files. In yet another embodiment in which the source is input from a telematics unit 120, the phone numbers and nametags that form the nametag data file are audio data files and correlated phoneme sets.

The user also inputs a target vehicle identifier when entering the phone numbers and nametags to complete the nametag transfer request. The target vehicle identifier can be a vehicle identification number for the target vehicle 210.

The target vehicle 210 is the MVCU 210 to which the nametag data files are to be transferred. The method of receiving the nametag transfer request is described in detail below in reference to method 800 of FIG. 8.

During stage S204, the call center 170 determines a target vehicle (TV) 210 based on the nametag transfer request. The target vehicle 210 is determined by the target vehicle identifier included in the nametag transfer request. The determination of the target vehicle 210 includes receiving an acoustic profile of the target vehicle 210. The method of determining the target vehicle 210 is described in detail below in reference to method 900 of FIG. 9.

During stage S206, call center 170 generates a nametag data file including a text data file, a phoneme set and an audio data file. Stage S206 occurs if each nametag in the nametag data file selected for transfer to the target vehicle 210 does not include a correlated audio data file, phoneme set, and text data file. In that case, the call center 170 expands the received nametag data file to include a text data file, a phoneme set and an audio data file for each nametag in the nametag data file in the nametag transfer request.

Several embodiments of generating a nametag data file are possible depending on the type of data in the nametag data file (audio data files, text data files, and/or phoneme set) received in the nametag transfer request. If the nametag data file being transferred includes text data files, the call center 170 generates an audio data file from the text data files. Then the call center 170 generates a phoneme set from the audio data file. If the nametag data file being transferred includes audio data files, the call center 170 generates a correlated phoneme set for each nametag in the nametag data file. Then the call center 170 generates text data files from the phoneme sets.

Figure 3:
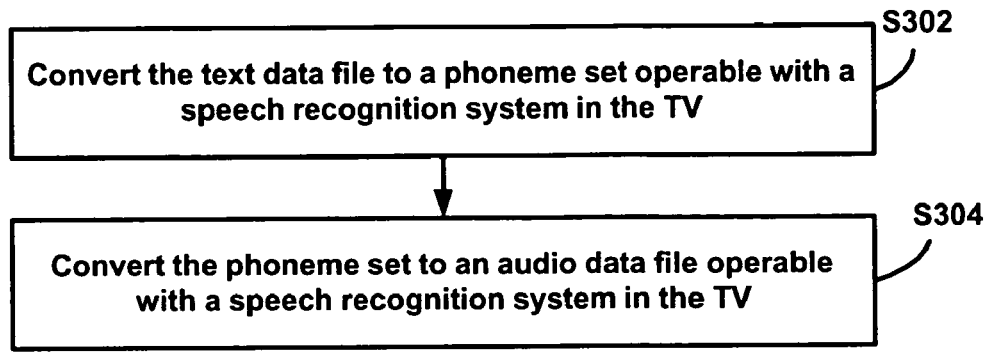
FIG. 3 illustrates a first embodiment of a method of generating a nametag data file in accordance with the present invention.

The method 300 described below with reference to FIG. 3 provides an exemplary embodiment of a method for generating a phoneme set when the nametag data file being transferred includes text data files. The methods 400-500 described below with reference to FIGS. 4-5, respectively, provide exemplary embodiments of methods 400, 500 for generating a text data file when the nametag data file being transferred includes audio data files.

During stage S208, call center 170 modifies the phoneme set within the nametag data file based on the acoustic profile of the target vehicle (TV) 210. The phoneme set for each nametag in the nametag data file is modified so that the ASR engine in the target vehicle 210 can recognize the modified phoneme set with a low error rate.

The several possible embodiments of methods for modifying the nametag data file depend on several factors. The determining factors include: the source; the ASR engine, if any, in the source; the ASR engine in the target vehicle 210; the acoustic profile of the source vehicle 110; the acoustic profile of the target vehicle 210; and the manner in which audio data file was generated during stage S206. The source may be source vehicle 110, an in-vehicle mobile phone 134, a personal communication device 138, or a client, personal or user computer 150. The phoneme set is modified if the acoustic profile of the target vehicle 210 and the ASR engine in the target vehicle 210 do not match the acoustic profile of the source vehicle 110 and the ASR engine in the source vehicle 110.

In one embodiment, the phoneme set in the nametag data file is generated from a text data file. In this case, the generated phoneme set is subsequently modified so that the phonemes match the acoustic profile of the target vehicle 210. In this manner, method 200 increases the rate of success for recognition of modified phonemes at the ASR engine in the target vehicle 210. In another embodiment, the phoneme set in the nametag data file was generated from an audio data file generated in a source vehicle 110. If there is a mismatch between the acoustic profiles of the target vehicle 210 and the source vehicle 110, the acoustic profile of the source vehicle 110 is de-convolved from the phoneme set, and is subsequently convolved with the acoustic profile of the target vehicle 210.

In one embodiment, stage S208 precedes stage S206. In this case, the phoneme set is modified to match the acoustic profile of the target vehicle 210 before the text data file and/or the audio data file are generated.

The methods 1000-1300 described below with reference to FIGS. 10-13, respectively, provide details for four embodiments of a method in accordance with the instant invention for modifying the nametag data file.

During stage S210, the call center 170 transmits the generated nametag data file to the target vehicle 210 that was determined during stage S204. The nametag data file includes the text data file, the phoneme set modified for the target vehicle 210 and the audio data file.

During stage S212, the nametag data file is received at the telematics unit (TU) 120 of the target vehicle 210 and is stored in the in-vehicle memory 128. In one embodiment, the nametag data file is also stored in the one or more communication services databases 176 in the call center 170.

FIG. 3 illustrates a first embodiment of a method 300 of generating a nametag data file in accordance with the present invention. The call center 170 has stored in computer readable medium at least one computer program including computer readable code to perform the operations described with reference to method 300. In this embodiment, one or more nametags in the nametag data file selected for transfer to the target vehicle 210 include text data files.

During stage S302, communication services manager 174 converts the text data file for each nametag in the nametag data file to a phoneme set. The phoneme set is recognizable by the speech recognition system 136 in the target vehicle (TV) 210. The communication services manager 174 activates an ASR engine to generate the phoneme set. ASR engines are located in one or more communication services databases 176 in the call center 170 and include the hardware and software to generate phoneme sets. In one embodiment, the ASR engine sequentially generates a phoneme set for each text data file in the nametag data file and stores the phoneme set with the correlated text data file in a table in one or more communication services databases 176.

During stage S304, communication services manager 174 converts the phoneme set to an audio data file operable with a speech recognition system 136 in the target vehicle (TV) 210. The communication services manager 174 retrieves a phoneme-to-audio processor code from one or more communication services databases 176. The phoneme-to-audio processor code is applied to the phoneme set to generate an audio data file. In one embodiment, the communication services manager 174 sequentially applies the phoneme-to-audio processor code to each phoneme set and stores the generated audio data file with the phoneme set and the correlated text data file in a table in one or more communication services databases 176.

In this manner, three types of data for each nametag in the nametag data file are generated and added to the nametag table to form the nametag table. In one embodiment, the method 300 generates nametags for more than one language, as more fully described with reference to U.S. patent application Ser. No. 11/014,497.

Figure 4:
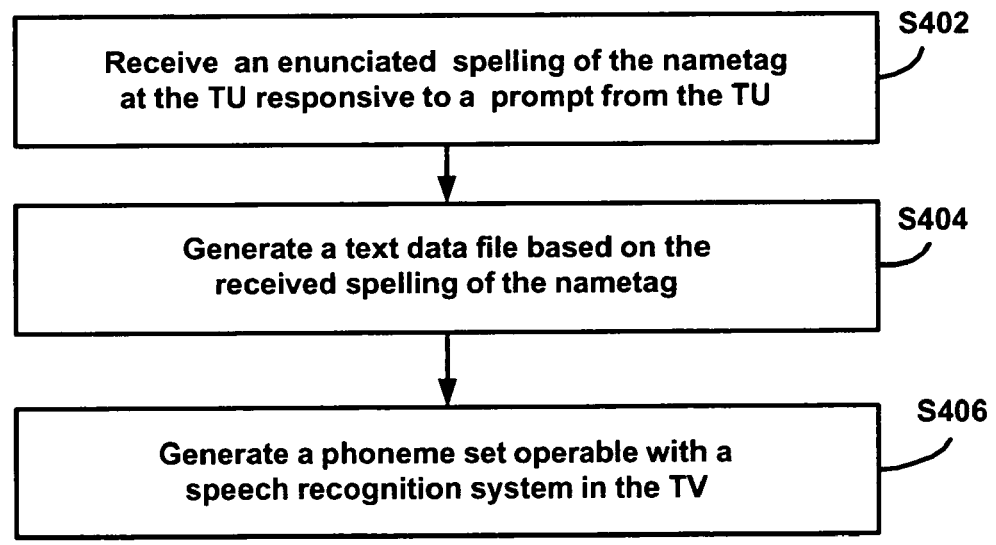
FIG. 4 illustrates a second embodiment of a method of generating a nametag data file in accordance with the present invention.

FIG. 4 illustrates another embodiment of a method 400 of generating a nametag data file in accordance with the present invention. The telematics unit 120, the processor 122, and call center 170 have stored in computer readable medium at least one computer program including computer readable code to perform the operations described with reference to method 400. In this embodiment, the nametag data file being transferred includes audio data files.

During stage S402, the telematics unit 120 receives an enunciated spelling of the nametag in the nametag transfer request responsive to a prompt from the telematics unit 120. In this embodiment, the nametag data file was generated as an audio data file when the user entered the nametags at the telematics unit to 120 by speaking into the microphone 130 in the source vehicle 110. The telematics unit 120 prompts the user to spell the nametag in order to generate a text file from the audio data file.

During stage S404, the speech recognition system 136 in the telematics unit 120 generates a text file based on the spelling of the nametag received during stage S402.

In one embodiment, the speech recognition system 136 converts the announced sequential letters, which spell the nametag to text data. The speech recognition system 136 converts the audio data file for each letter that forms the nametag into a phoneme set, which is recognized as a letter by the ASR speech engine. Then the speech recognition system 136 converts the recognized letter into a text data file. The telematics unit 120 then transmits the text data file and the audio data file to the call center 170. The received text data file and the correlated audio data file are stored in a table in one or more communication services databases 176.

In another embodiment, the telematics unit 120 receives the letters that form the nametag and transmits them as audio signals to the call center 170. In this case, the ASR speech engines in the call center 170 generate a text data file based on the received audio data file for each letter as described above. The text data file and the correlated audio data file are stored in a table in one or more communication services databases 176.

During stage S406, the call center 170 generates a phoneme set operable with a speech recognition system 136 in the target vehicle 210. The communication services manager 174 activates an ASR engine to generate the phoneme set from the received audio data file. The received audio data file is recognizable as the spoken nametag by the ASR engine in the target vehicle 210. This generated phoneme set is stored with the correlated text data file and the correlated audio data file in the table stored in one or more communication services databases 176.

In this manner, three types of data for each nametag in the nametag data file are generated and added to the nametag table to form the nametag table. In one embodiment, the method 400 generates nametags for more than one language, as more fully described with reference to U.S. patent application Ser. No. 11/014,497.

Figure 5:
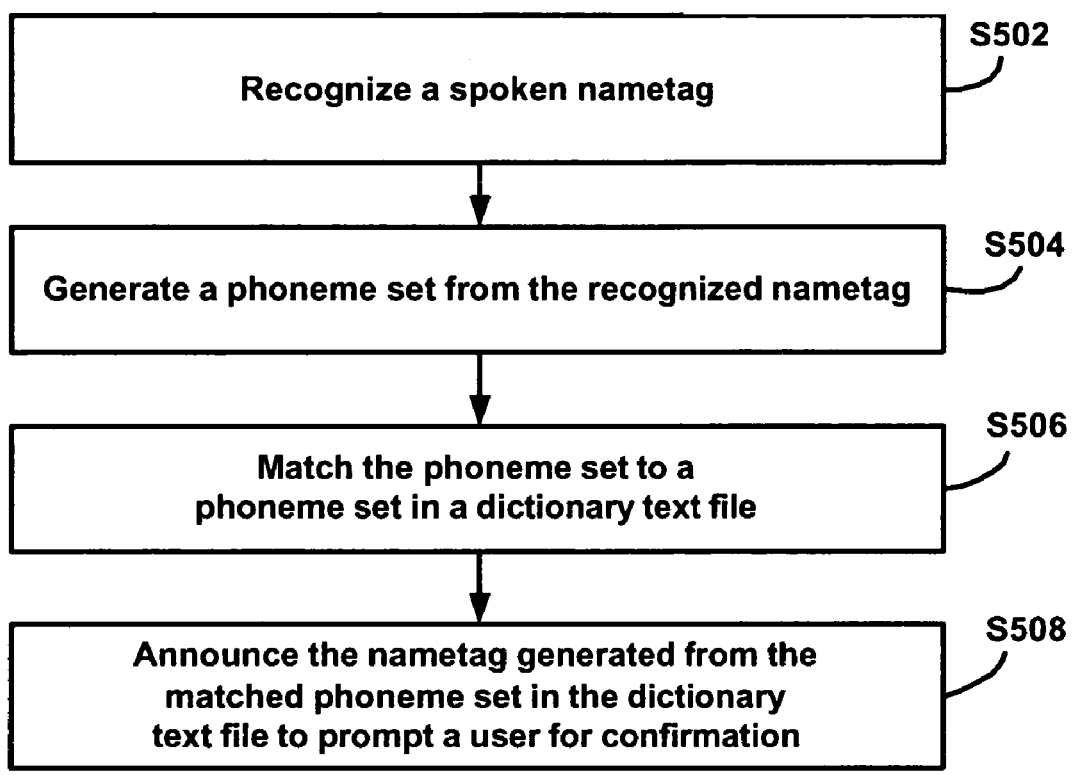
FIG. 5 illustrates a third embodiment of a method of generating a nametag data file in accordance with the present invention.

FIG. 5 illustrates a third embodiment of a method 500 of generating a nametag data file in accordance with the present invention. The telematics unit 120, the processor 122, and call center 170 have stored in computer readable medium at least one computer program including computer readable code to perform the operations described with reference to method 500.

During stage S502, the an advisor, such as advisor 168, at call center 170 recognizes a spoken nametag. The audio data file of the spoken nametag is a portion of the nametag data file. In one embodiment, the nametag is spoken into microphone 130 of the telematics unit 120 in the source vehicle 110 or the target vehicle 210. In that case, the telematics unit 120 transmits the audio data file to the call center 170.

In another embodiment, the nametag is spoken into microphone 130 of the telematics unit 120 in the source vehicle 110 or the target vehicle 210 and an ASR engine in the telematics unit 120 recognizes the spoken nametag.

In yet another embodiment, the audio data file of the spoken nametag is generated when the user speaks into a microphone (not shown) of a client, personal or user computer 150. In that case, a processor (not shown) in the client, personal or user computer 150 transmits the audio data file to the call center 170. Then an ASR engine in the call center 170 recognizes the spoken nametag.

During stage S504, the call center 170 generates a phoneme set from the recognized nametag. The communication services manager 174 activates an ASR engine to generate the phoneme set as described above with reference to stage S302 of method 300 in FIG. 3.

In the embodiment in which the nametag is recognized in the telematics unit 120 in the source vehicle 110, the speech recognition system 136 in the telematics unit 120 generates a phoneme set from the recognized nametag. In this case, the generated phoneme set is transmitted to the call center 170 from the telematics unit 120.

During stage S506, the call center 170 matches the phoneme set to a phoneme set in a dictionary text file. The dictionary text file is stored in one or more communication services databases 176 in the call center 170. The communication services manager 174 retrieves the dictionary text file from the one or more communication services databases 176 and compares the phoneme set generated during stage S504 to the phoneme sets in the dictionary text file.

Table 1 below shows an exemplary portion of a dictionary text file. The first column of the dictionary text file includes the text data file and the second column of the dictionary text file includes one or more phoneme sets for the text data file. The text data file and correlated phoneme set are in the same row of Table 1.

TABLE 1

| TEXT DATA FILE | PHONEME SET |
| --- | --- |
| OFTEN | (AO-F-AH-N | AOF-T-AH N) |
| ZERO | (Z-IH-R-OW | ZIY-ROW) |
| CHRIS | K-R-IH-S |

As shown in Table 1, the word "often" and the word "zero" each have two possible pronunciations and the word "Chris" has only one pronunciation. Some words have more than two possible pronunciations.

The communication services manager 174 retrieves the correlated text data file when a match if determined. The audio data file of the spoken nametag, the phoneme set and the correlated text data file comprise the three types of data for the nametag spoken into the microphone 130.

During stage S508, the call center 170 announces the nametag generated from the matched phoneme set in the dictionary text file to prompt a user for confirmation. The communication services manager 174 generates an audio data file from the matched phoneme set in the speech recognition system 136. If the user spoke the nametag in the source vehicle 110 or the target vehicle 210, the audio data file is transmitted to the respective source vehicle 110 or the target vehicle 210. The received audio data file includes instructions configured to generate acoustic waves at one or more speakers 132 so that the user hears "Did you say John?" if the nametag matches the text data file JOHN. Other phrases can be used to prompt the confirmation from the user.

If the user spoke the nametag into a microphone (not shown) of a client, personal or user computer 150, the audio data file is transmitted to client, personal or user computer 150 from the call center 170. The audio data file received at the client, personal or user computer 150 includes instructions configured to generate acoustic waves at one or more speakers (not shown) in the client, personal or user computer 150 so that the user hears "Did you say John?" if the nametag was matched to the text data file JOHN. As described above, three types of data for each nametag in the nametag data file are generated and added to the nametag table to form the nametag table.

If the user responds to the prompt with a "Yes," call center 170 stores the audio data file used to prompt the user, the phoneme set generated during stage S504 and the correlated text data file matched in the dictionary text file during stage S506 as a nametag in the nametag data file. In this manner, three types of data for each nametag in the nametag data file are generated and added to the nametag table to form the nametag table. In one embodiment, the method 500 generates nametags for more than one language, as more fully described with reference to U.S. patent application Ser. No. 11/014,497.

If the user responds to the prompt with a "No," the flow of method 500 returns to stage S506 and the communication services manager 174 continues to compare the phoneme set generated during stage S504 to the phoneme sets in the dictionary text file. In one embodiment, in response to a negative confirmation, the user is prompted at the telematics unit 120 to repeat the spoken nametag and the flow of method 500 returns to stage S502.

Figure 6:
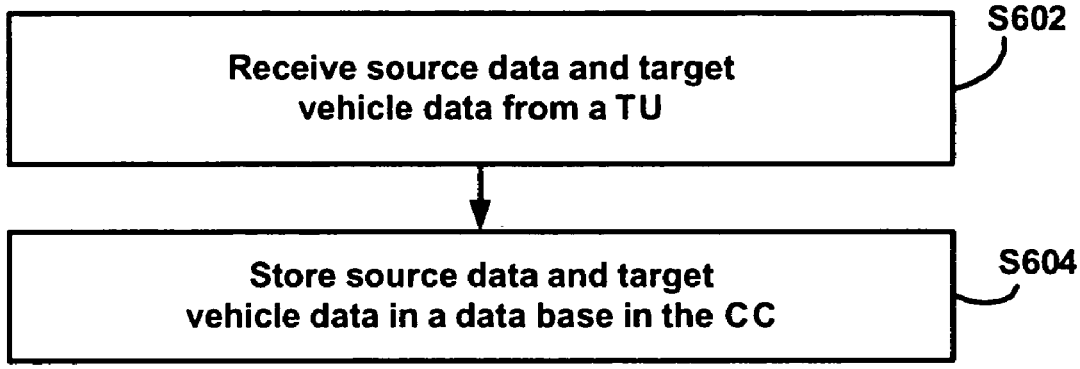
FIGS. 6 and 7 illustrate methods of receiving source data and target vehicle data in accordance with the present invention.
Figure 7:
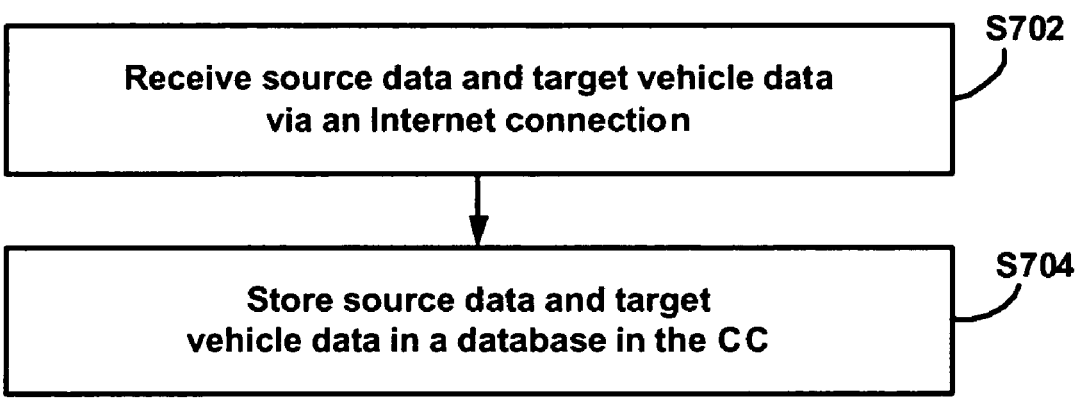

FIGS. 6 and 7 illustrate respective methods 600 and 700 of receiving source data and target vehicle data in accordance with the present invention for storage in one or more communication services databases 176 in the call center 170. At least portions of the stored source data and target vehicle data are retrieved when a nametag transfer request is received at the call center 170. The call center 170, the telematics unit 120, the processor 122, and the source, such as an MVCU 110, in-vehicle mobile phone 134 or personal communication device 138, have stored in computer readable medium at least one computer program including computer readable code to perform the operations described with reference to methods 600 and 700. Method 600 describes how to receive data from a telematics unit 120. Method 700 describes how to receive data via an Internet connection.

In method 600 during stage S602, the call center 170 receives source data and target vehicle data from a telematics unit 120.

The target vehicle data includes a target vehicle identifier, the acoustic profile of the target vehicle 210 and a target vehicle speech recognition identifier. The target vehicle identifier can be the vehicle identification number (VIN) of the target vehicle 210. The acoustic profile of the target vehicle 210 includes an audio data file of the acoustic characteristics for the target vehicle 210. When the acoustic characteristics for the target vehicle 210 are added to the audio data file of a phrase spoken in a noise-free environment, the modified audio data file is similar to the audio data file of the same phrase spoken in the target vehicle 210 when the target vehicle 210 is in the idle condition. The target vehicle speech recognition identifier is a code that identifies the version of ASR engine used in the speech recognition system 136 in the target vehicle 210.

If the source is the source vehicle 110, the source data is source vehicle data, which includes a source identification, an acoustic profile of the source vehicle 110, and a source vehicle speech recognition identifier. The source identification can be the vehicle identification number (VIN) of the source vehicle 110. The acoustic profile of the source vehicle 110 includes an audio data file of the acoustic characteristics for the source vehicle 110. When the acoustic characteristics for the source vehicle 110 are added to the audio data file of a phrase spoken in a noise-free environment, the modified audio data file is similar to the audio data file of the same phrase spoken in the source vehicle 110 when the source vehicle 110 is in the idle condition. The source vehicle speech recognition identifier is a code that identifies the version of ASR engine used in the speech recognition system 136 in the source vehicle 110.

The acoustic profile of the target vehicle 210 and the acoustic profile of the source vehicle 110 can be retrieved from target vehicle data and source data that includes the year, make, and model of the target vehicle 210 and source vehicle 110, respectively. In this case, the communication services manager 174 uses a lookup table in the communication services databases 176 in the call center 170. The lookup table links the vehicle year, make, and model to an acoustic profile. In one embodiment, the lookup table links the target vehicle identifier with a target vehicle's year, make, model and acoustic profile and the lookup table links the source identification with a source vehicle's year, make, model and acoustic profile.

The target vehicle speech recognition identifier and the source vehicle speech recognition identifier can be retrieved from target vehicle data and source vehicle data that includes the year, make and model of the target vehicle 210 and source vehicle 110, respectively. In this case, the communication services manager 174 uses a lookup table in the communication services databases 176 in the call center 170. The lookup table links the vehicle year, make, and model to speech recognition identifier. In one embodiment, the lookup table links the target vehicle identifier with a target vehicle's year, make, model and acoustic profile and the lookup table links the source identification with a source vehicle's year, make, model and acoustic profile. In one embodiment, a lookup table links the vehicle year, make, and model, speech recognition identifier and acoustic profile with the target vehicle identifier and/or source identification.

The source vehicle data can include the nametag data file stored in the in-vehicle memory 128 of the telematics unit 120 in the source vehicle 110. In this embodiment, the source vehicle data is retrieved from the in-vehicle memory 128 by the processor 120 in the telematics unit 120 and transmitted to the call center 170. In one embodiment, the nametag data file is stored in the call center 170, and is periodically updated to include recently added nametags input by the user at the telematics unit 120. In that case, the call center 170 periodically requests that updates to the nametag data in the telematics unit 120 be transferred to the call center 170, as is understandable by those of ordinary skill in the art. In one embodiment, the telematics unit 120 transmits updates to the nametag data file at the call center 170 each time the user adds a new nametag to the nametag data file in the telematics unit 120.

If the source is a personal communication device 138 or an in-vehicle mobile phone 134, the source data includes a source identification, and, in some cases, a source speech recognition identifier. The source identification is operable to uniquely identify the in-vehicle mobile phone 134 or the personal communication device 138. The source identification can be an electronic serial number of a mobile phone or a PDA. The source speech recognition identifier is a code that identifies the version of ASR engine, if any, used in the in-vehicle mobile phone 134 or personal communication device 138.

In one embodiment, the source data includes the nametag data file currently stored the in-vehicle mobile phone 134 or personal communication device 138. The source data stored in a memory (not shown) in the personal communication device 138 or the in-vehicle mobile phone 134 can be downloaded to the telematics unit 120 in data packets. The telematics unit 120 is triggered by information on the received data packet headers to transmit the received source data to the call center 170.

In one embodiment, source data is transmitted from more than one of the source vehicle 110, the personal communication device 138, or the in-vehicle mobile phone 134 to the call center 170 via the telematics unit 120.

During stage S604, the source data and target vehicle data are stored in the one or more communication services databases 176 in the call center 170. In one embodiment, the target vehicle data is not stored in the call center 170 but is received with a nametag transfer request.

In method 700, during stage S702, the call center 170 receives source data and target vehicle data via an Internet connection. The Internet connection is initiated by a user or a sales agent in a vehicle dealership. The call center 170 and personal or user computer 150 have stored in computer readable medium at least one computer program including computer readable code to perform the operations described with reference to method 600.

The target vehicle data includes a target vehicle identifier, the acoustic profile of the target vehicle and a target vehicle speech recognition identifier as described above with reference to stage S602 of method 600 in FIG. 6. The source data includes one or more of the source identification, the acoustic profile of the source vehicle 110, the source speech recognition identifier, and the nametag data file currently stored in the MVCU 110. As described above with reference to stage S602 of method 600 in FIG. 6, the source data is from the source vehicle 110, the personal communication device 138, or the in-vehicle mobile phone 134. The source data and the target vehicle data are transmitted to the call center 170 over the Internet connection.

In one embodiment, the source identification includes an indication that the source is computer 150. In this case, the source data does not include an acoustic profile of the source vehicle 110 or the source speech recognition identifier.

In another embodiment, a vehicle dealership (not shown) initiates the Internet connection. The vehicle dealership sells MVCUs 110 and MVCUs 210 to users. In some cases, a user is selling a source vehicle 110 and buying a target vehicle 210. In that case, the user or the sales person at the vehicle dealership downloads source data, including a nametag data file, from the MVCU 110 into the computer 150 as part of a nametag transfer request. Then the source data and target data in the nametag transfer request is transmitted via the Internet to the call center 170. The call center 170 generates a nametag data file including the text data file, the phoneme set and the audio data file for each nametag in the nametag data file and transmits the nametag data file to the newly purchased MVCU 210.

In another embodiment, a user is buying a target vehicle 210 and downloads the nametags to be transferred to the target vehicle 210 from a personal communication device 138 into the computer 150. Then the source data and target data is transmitted via the Internet to the call center 170 as part of a nametag transfer request. The call center 170 generates a nametag data file including a text data file, a phoneme set and an audio data file and transmits the nametag data file to the newly purchased MVCU 210.

During stage S704, the source data and target vehicle data are stored in the one or more communication services databases 176 in the call center 170. In one embodiment, the target vehicle data is not stored in the call center 170 but is received with a nametag transfer request.

Figure 8:
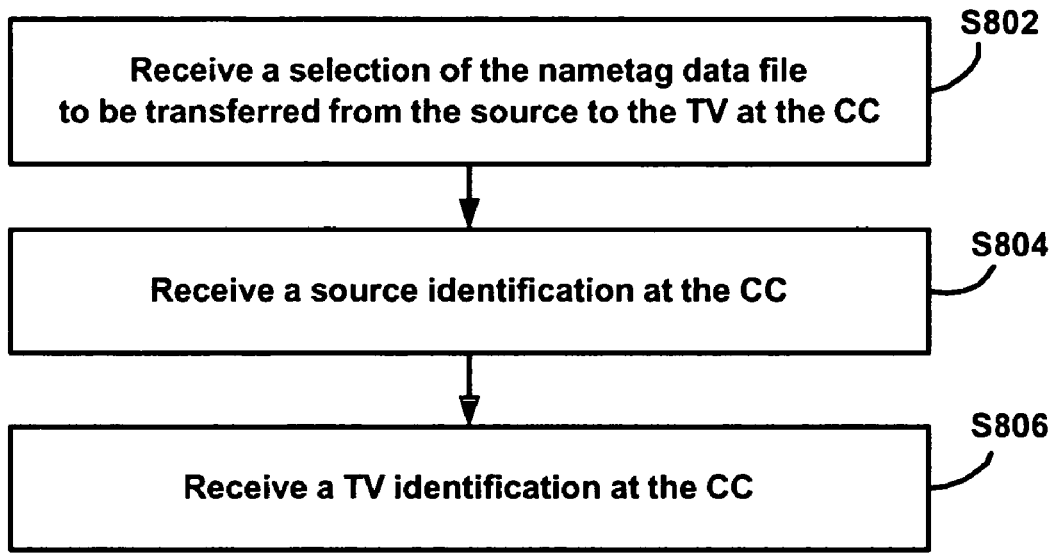
FIG. 8 illustrates a method of receiving a nametag transfer request in accordance with the present invention.

FIG. 8 illustrates one embodiment of a method 800 of receiving a nametag transfer request in accordance with the present invention. The call center 170 has stored in computer readable medium at least one computer program including computer readable code to perform the operations described with reference to method 800.

During stage S802, the call center 170 receives a selection of the nametag data file to be transferred from the source to the target vehicle (TV) 210. The user selected nametag data file is a first component of the nametag transfer request. The selected nametag data file is part or all of the nametag data file currently stored at the MVCU 110.

During stage S804, the call center 170 receives a source identification. The source identification is a second component of the nametag transfer request. During stage S806, the call center 170 receives a target vehicle identifier. The target vehicle identifier is a third component of the nametag transfer request. The source identification and target vehicle identifier were described above with reference to stage S602 of method 600 in FIG. 6 and stage S702 of method 700 in FIG. 7. The selection of the nametag data file, the source identification, and the target vehicle identifier are received with instructions to transfer the selected nametag data file to the target vehicle 210.

In one embodiment, the nametag transfer request does not include a selection of the nametag data file. In that embodiment, the complete nametag data file is retrieved from one or more communication services databases 176 in response to receiving the nametag transfer request. The complete nametag data file is stored in the call center 170, according to the methods 600 and 700 described above with reference to FIGS. 6 and 7, respectively.

Figure 9:
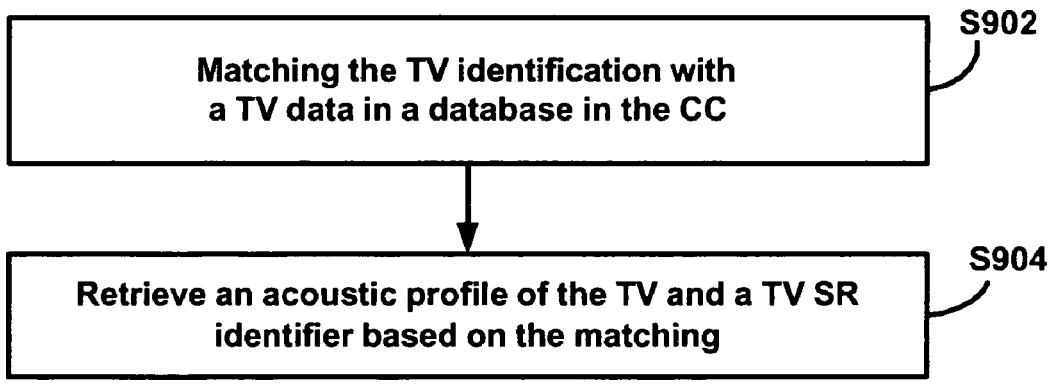
FIG. 9 illustrates a method of determining a target vehicle in accordance with the present invention.

FIG. 9 illustrates a method 900 of determining a target vehicle 210 in accordance with the present invention. The call center 170 has stored in computer readable medium at least one computer program including computer readable code to perform the operations described with reference to method 900.

During stage S902, the call center 170 matches the target vehicle identification with the target vehicle data in one or more communication services databases 176 in the call center 170. The communication services manager 174, having received the target vehicle identifier with the nametag transfer request, searches for a match to the target vehicle identifier in the communication services databases 176.

During stage S904, the communication services manager 174 retrieves the acoustic profile of the target vehicle 210 and a target vehicle speech recognition identifier, which are linked to the matched target vehicle identifier. In embodiments in which the target vehicle data is not stored in the call center 170, the data transfer request includes the acoustic profile of the target vehicle 210 and a target vehicle speech recognition identifier.

Figure 10:
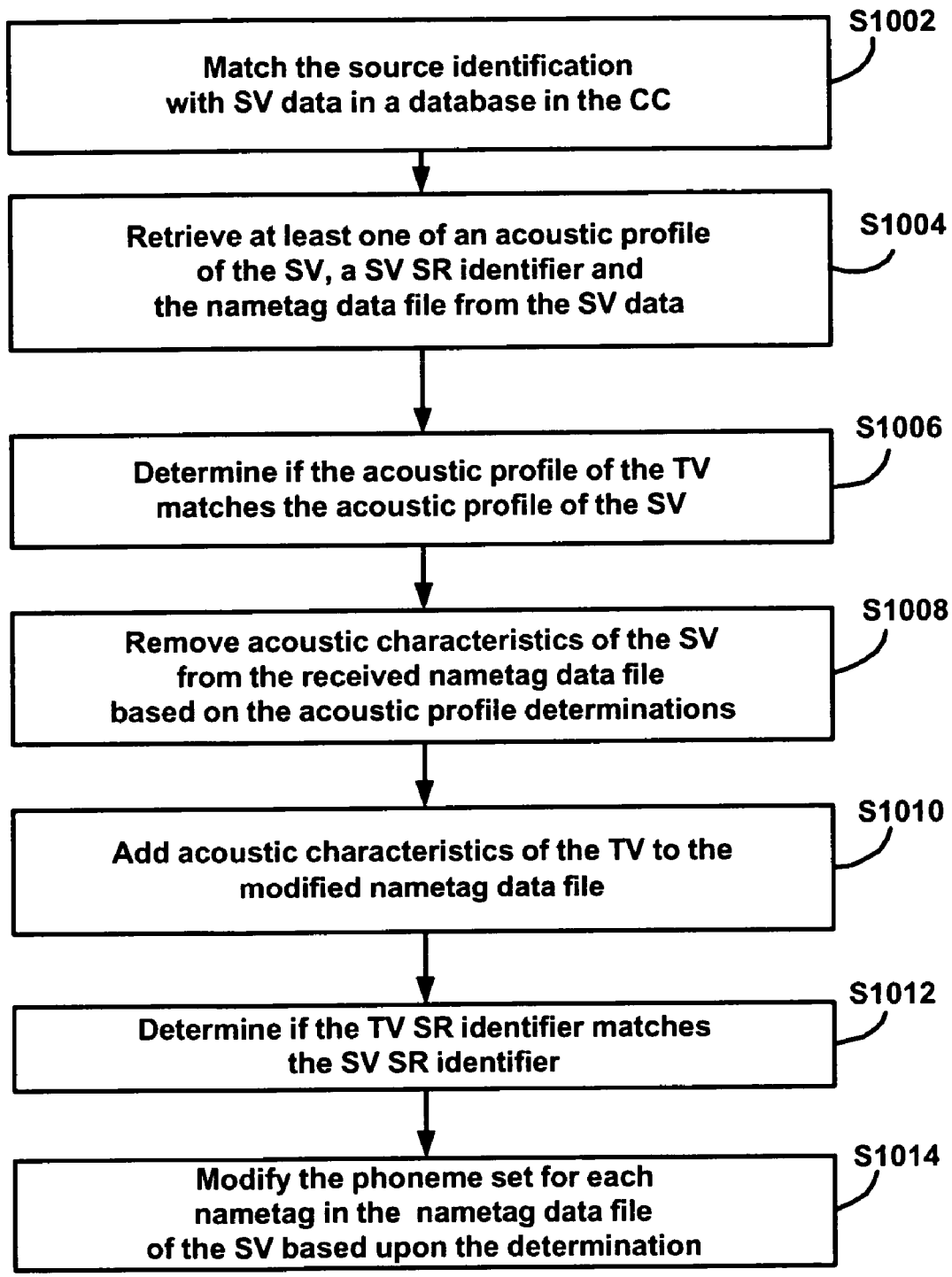
FIG. 10 illustrates a first embodiment of a method of modifying a nametag data file in accordance with the present invention.

FIG. 10 illustrates a first embodiment of a method 1000 of modifying a nametag data file in accordance with the present invention. The call center 170 has stored in computer readable medium at least one computer program including computer readable code to perform the operations described with reference to method 1000. In this embodiment, the source is a source vehicle 110 in which the nametag data file being transferred includes audio data files.

During stage S1002, communication services manager 174 in the call center 170 matches the source identification, received during stage S602 described above with reference to method 600 of FIG. 6, with source vehicle 110 data stored in communication services databases 176 in the call center 170. The source identification is linked to the other source vehicle data, which includes the acoustic profile of the source vehicle 110, and the source vehicle speech recognition identifier. The source identification is also linked to the nametag data file if that was part of the source vehicle data.

During stage S1004, the communication services manager 174 in the call center 170 retrieves at least one of the acoustic profile of the source vehicle 110, the source vehicle speech recognition identifier, and the nametag data file from the source vehicle data stored in the communication services databases 176. The source vehicle speech recognition identifier is used to identify the version of the ASR engine in the source vehicle 110.

During stage S1006, the communication services manager 174 in the call center 170 determines if the acoustic profile of the target vehicle 210 matches the retrieved acoustic profile of the source vehicle 110.

During stage S1008, the communication services manager 174 removes the acoustic characteristics of the source vehicle 110 from the received nametag data file based on the acoustic profile determinations of stage S1006. If the acoustic profile of the target vehicle 210 matches the acoustic profile of the source vehicle 110, the audio data file of the nametag data file is not modified. If the acoustic profile of the target vehicle 210 mismatches the acoustic profile of the source vehicle 110, then the acoustic characteristics of the source vehicle 110 are removed from nametags in the received selected nametag data file to form a modified nametag data file.

The acoustic profile of the source vehicle 110 includes an audio data file in which the acoustic characteristics of the source vehicle 110 are embedded. The acoustic characteristics of the source vehicle 110 include the noise generated by the source vehicle 110 when the source vehicle 110 is in the idle condition. The communication services manager 174 applies a processor code to the acoustic profile of the source vehicle 110 to obtain the acoustic characteristics of the source vehicle 110. In one embodiment, the acoustic profile of the source vehicle 110 is the acoustic characteristics of the source vehicle 110 from the audio data file.

The acoustic profile of the source vehicle 110 is de-convolved from the audio data file for each nametag in the nametag data file to create an audio data file without background noise for each nametag in the nametag data file.

The method described for stage S1010 occurs only if the acoustic profile of the source vehicle 110 was determined to differ from the acoustic profile of the target vehicle 210 during stage S1006. During stage S1010, the communication services manager 174 in the call center 170 adds the acoustic characteristics of the target vehicle 210 to the modified nametag data file. The acoustic profile of the target vehicle 210 includes an audio data file in which the acoustic characteristics of the target vehicle 210 are embedded. The acoustic characteristics of the target vehicle 210 include the noise generated by the target vehicle 210 when the target vehicle 210 is in the idle condition. The communication services manager 174 applies a processor code to the acoustic profile of the target vehicle 210 to obtain the acoustic characteristics of the target vehicle 210. In one embodiment, the acoustic profile of the target vehicle 210 is the acoustic characteristics of the target vehicle 210.

The acoustic profile of the target vehicle 210 is convolved with the audio data file without background noise for each nametag in the nametag data file to create an audio data file with the background noise of the target vehicle 210 for each nametag in the nametag data file. Then a correlated phoneme set is generated for the audio data file of each nametag in the nametag data file. In one embodiment, the communication services manager 174 adds acoustic characteristics of the target vehicle 210 to the phoneme set without modifying the audio data file.

The modification of the phoneme sets for each nametag in the nametag data file increases the probability of the ASR engine in the target vehicle 210 recognizing phrases spoken by a user in the source vehicle 120.

During stage S1012, the communication services databases 176 in the call center 170 determines if the target vehicle 210 speech recognition identifier matches the source vehicle speech recognition identifier. During stage S1014, the communication services databases 176 in the call center 170 modifies the phoneme set for each nametag in the nametag data file of the source vehicle 110 based on the determination made during stage S1012.

If the target vehicle speech recognition identifier matches the source vehicle speech recognition identifier, the phoneme set for each nametag in the nametag data file is not modified. If the target vehicle speech recognition identifier does not match the source vehicle speech recognition identifier, the audio data file and the phoneme set for each nametag in the nametag data file is modified. The modification ensures the audio data file and phoneme set for each nametag in the nametag data file is compatible with the version of the ASR engine in the target vehicle 210.

Figure 11:
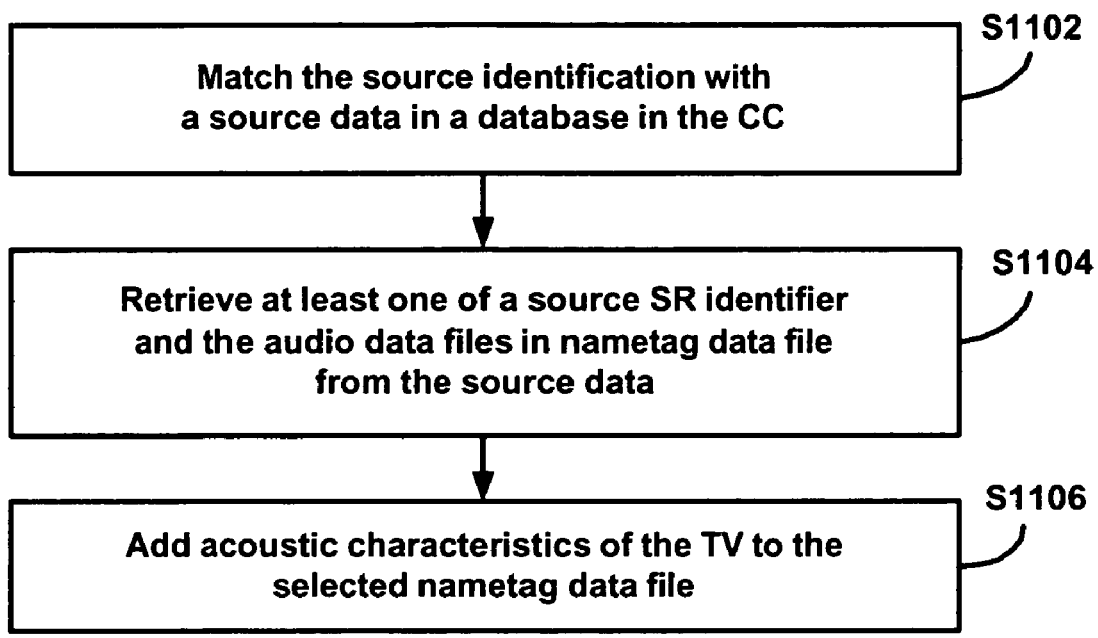
FIG. 11 illustrates a second embodiment of a method of modifying a nametag data file in accordance with the present invention.

FIG. 11 illustrates a second embodiment of a method 1100 of modifying a nametag data file in accordance with the present invention. In this embodiment, the source is a personal communication device 138 or an in-vehicle mobile phone 134 in which the nametag data file being transferred includes audio data files. The call center 170 has stored in computer readable medium at least one computer program including computer readable code to perform the operations described with reference to method 1100.

During stage SI102, the communication services manager 174 in the call center 170 matches the source identification, which was received with the nametag transfer request, with a source data stored in communication services databases 176 in the call center 170. The source identification is linked to the other source data, which includes the source speech recognition identifier and may include the nametag data file.

During stage SI104, the communication services manager 174 in the call center 170 retrieves at least one of the source speech recognition identifier, and the audio data files in the nametag data file from the source data stored in the communication services databases 176.

During stage S1106, the communication services manager 174 in the call center 170 adds the acoustic characteristics of the target vehicle 210 to the audio file for each nametag in the nametag data file selected in the nametag transfer request. The method of adding acoustic characteristics of the target vehicle 210 to a nametag data file was described above in reference to stage S1010 of method 1000 in FIG. 10. Then a correlated phoneme set is generated for the audio data file of each nametag in the nametag data file. The generated phoneme set is operable to be recognized by the speech recognition system 136 in the target vehicle 210. The modified phoneme set is stored in the call center 170. In one embodiment, the communication services manager 174 adds acoustic characteristics of the target vehicle 210 to the phoneme set without modifying the audio data file.

Figure 12:
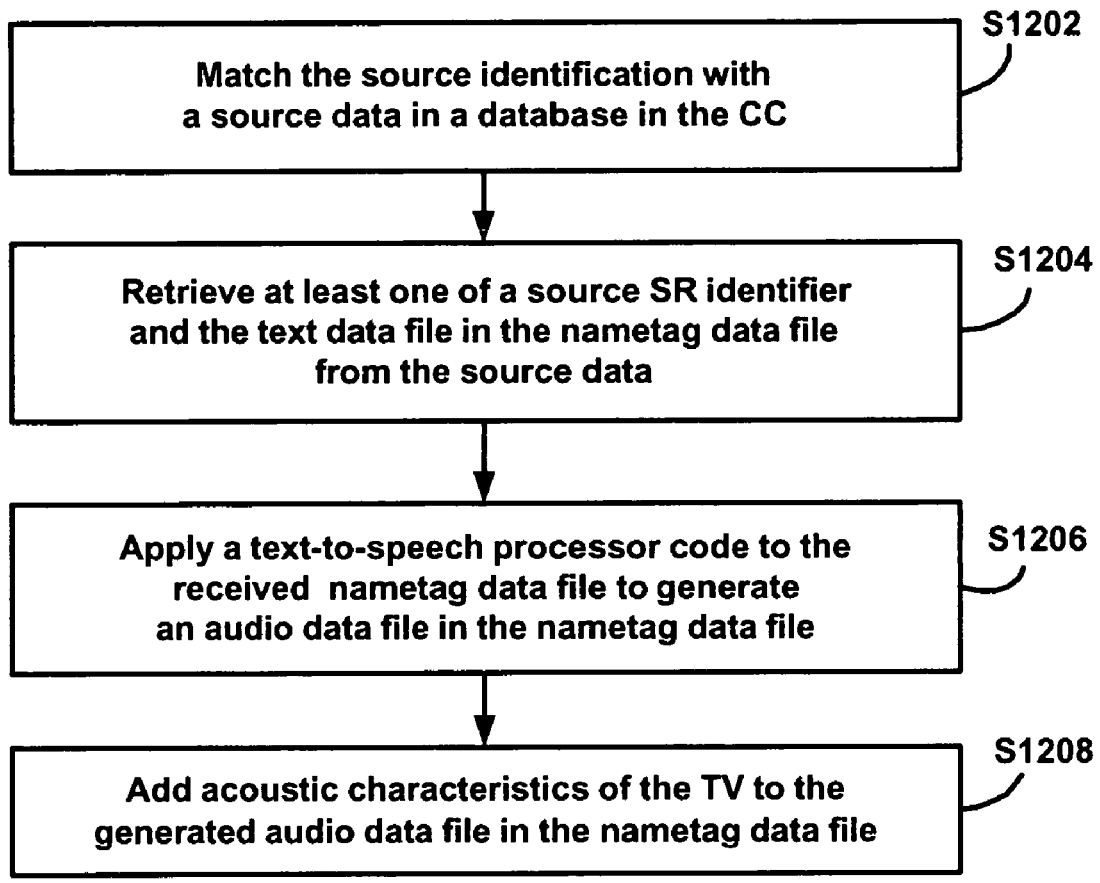
FIG. 12 illustrates a third embodiment of a method of modifying a nametag data file in accordance with the present invention.

FIG. 12 illustrates a third embodiment of a method 1200 of modifying a nametag data file in accordance with the present invention. In this embodiment, the source is a personal communication device 138 or an in-vehicle mobile phone 134 in which the nametag data file being transferred includes text data files. The call center 170 has stored in computer readable medium at least one computer program including computer readable code to perform the operations described with reference to method 1200.

During stage S1202, the communication services manager 174 matches the source identification, which was received with the nametag transfer request, with a source data stored in communication services databases 176 in the call center 170. The source identification is linked to the other source data, which includes the source speech recognition identifier and may include the nametag data file.

During stage S1204, the communication services manager 174 in the call center 170 retrieves at least one of the source speech recognition identifier, and the text data file in the nametag data file from the source data stored in the communication services databases 176.

During stage S1206, the communication services manager 174 in the call center 170 applies a text-to-speech processor code to the received selected nametag data file to generate an audio data file in the nametag data file. In one embodiment, the call center 170 determines the gender of a user. If the user of the target vehicle 210 is a male, the call center 170 generates a male audio data file. If the user of the target vehicle 210 is a female, the call center 170 generates a female audio data file.

During stage S1208, the communication services manager 174 in the call center 170 adds the acoustic characteristics of the target vehicle 210 to the generated audio data file in the nametag data file. The method of adding acoustic characteristics of the target vehicle 210 to a nametag data file was described above in reference to stage S1010 of method 1000 in FIG. 10. Then a correlated phoneme set is generated for the audio data file of each nametag in the nametag data file. In one embodiment of method 1200, the phoneme set is generated from an audio data file and the phoneme set is modified for the acoustic characteristics of the target vehicle target vehicle 210.

Figure 13:
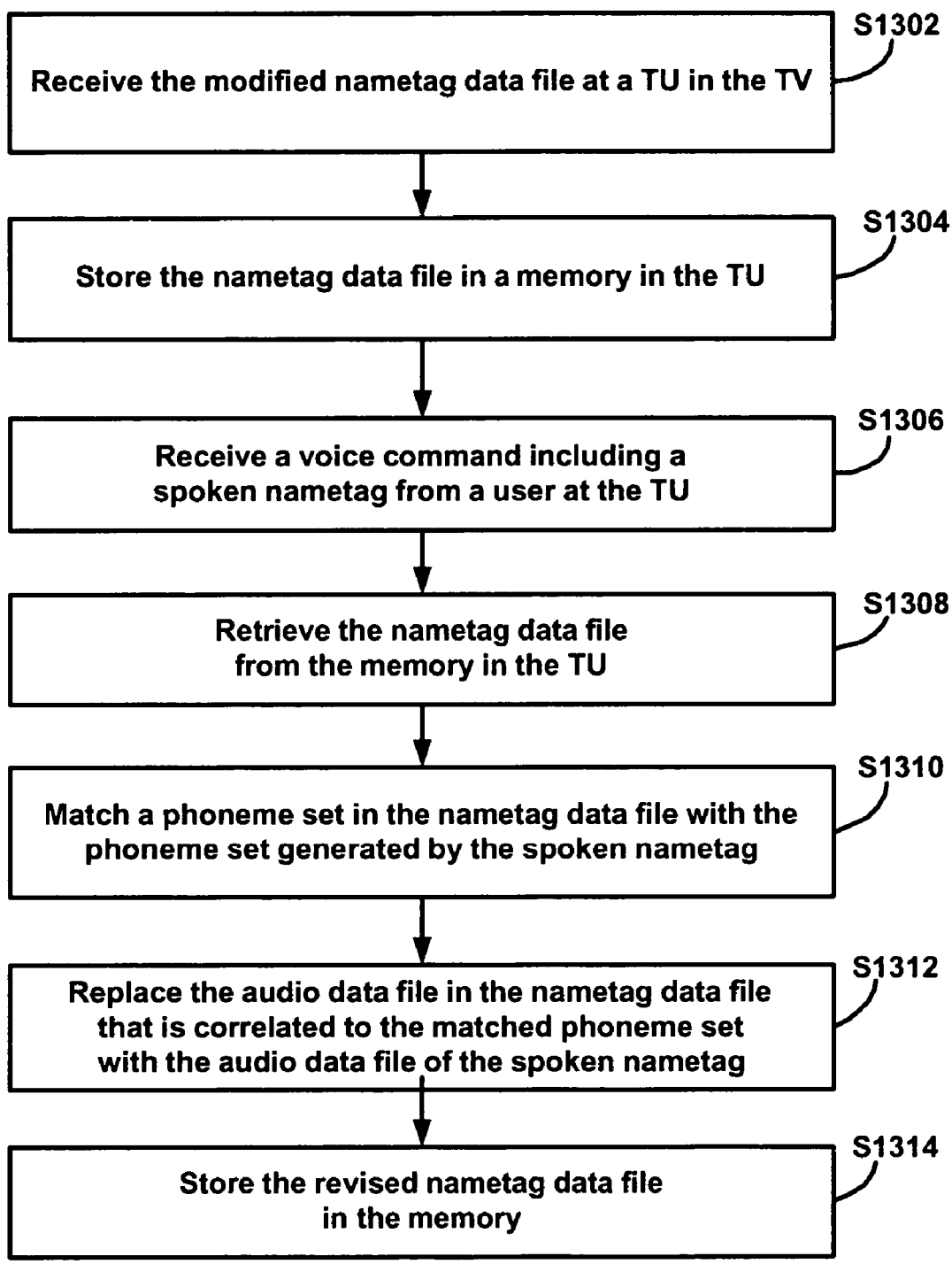
FIG. 13 illustrates a method of revising a nametag data file at the telematics unit in accordance with the present invention.

FIG. 13 illustrates a method 1300 of revising a nametag data file at the telematics unit 120 in accordance with the present invention. The telematics unit 120 has stored in computer readable medium at least one computer program including computer readable code to perform the operations described with reference to method 1300.

During stage S1302, the telematics unit 120 in the target vehicle 210 receives the modified nametag data file wherein the modified nametag data file includes an audio data file generated as described above with reference to stage S1206 in method 1200 of FIG. 12. The nametag data file was transmitted to the telematics unit 120 in the target vehicle 210 as described above with reference to stage S210 in method 200.

During stage S1304, the processor 122 in the telematics unit 120 stores the nametag data file in the in-vehicle memory 128. During stage S1306, the telematics unit 120 receives a voice command spoken by the user into the microphone 130. The voice command includes a spoken nametag. The audio signal of the spoken nametag generates an audio data file. The audio data file of the spoken nametag is converted to a phoneme set in the speech recognition system 136.

During stage S1308, the telematics unit 120 retrieves the nametag data file from the in-vehicle memory 128 in response to receiving the voice command. During stage S1310, the speech recognition system 136 in the telematics unit 120 matches a phoneme set in the nametag data file with the phoneme set generated from the spoken nametag. The matched phoneme set is correlated with an audio data file in the nametag data file.

During stage S1312, the processor 122 in telematics unit 120 replaces the audio data file in the nametag data file that is correlated to the matched phoneme set with the audio data file of the spoken nametag. During stage S1314, the processor 122 in telematics unit 120 stores the revised nametag data file in the in-vehicle memory 128. In this manner, the audio data file in the nametag data file is replaced with the user-voice generated nametags, as the audio data file nametags in the nametag data file are spoken by the user in a voice command.

In one embodiment, the method 1300 revises a nametag data file at the telematics unit 120 for more than one language, as more fully described with reference to U.S. patent application Ser. No. 11/014,497.

Figure 14:
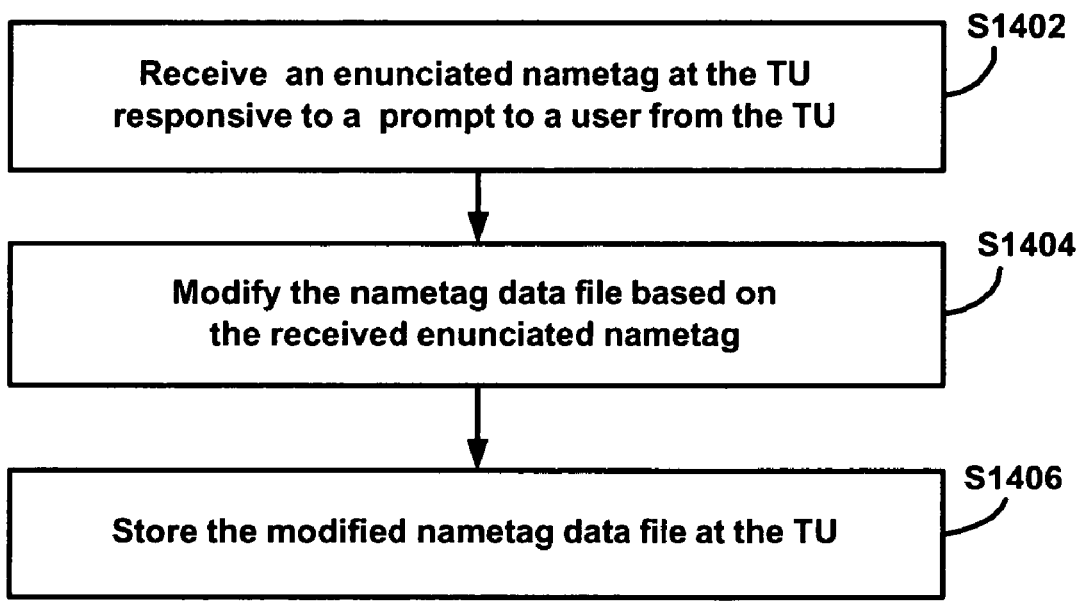
FIG. 14 illustrates a method of managing user nametags for a vehicle communications system in accordance with the present invention.

Method 1300 described a method of revising a nametag data file at the telematics unit 120 in response to receiving a spoken command with a nametag. FIG. 14 illustrates a method 1400 of managing user nametags for a mobile vehicle communications system 100 in accordance with the present invention in which the telematics unit 120 initiates a revision of the nametag data file.

During stage S1402, the telematics unit 120 receives an enunciated nametag responsive to a prompt to the user from the telematics unit 120 to the user of the target vehicle 210. The prompt is initiated the first time the user operates the target vehicle 210 after the telematics unit 120 receives the modified nametag data file as described above with reference to method 200 of FIG. 2. In one embodiment, the telematics unit 120 prompts a user of the target vehicle 210 to say each nametag in the nametag data file stored in the telematics unit 120. In one embodiment, the telematics unit 120 prompts a user of the target vehicle 210 by announcing "Say John." After the user speaks the word "John," into the microphone 130 in the telematics unit 120, the user is prompted to say another name. The telematics unit 120 continues to prompt the user until all the names correlated to nametags in the nametag data file have been announced by the user or until the user turns off the target vehicle 210.

During stage S1404, telematics unit 120 modifies the nametag data file based on the received enunciated nametag from the user. The telematics unit 120 replaces the audio data file of the nametag data file for the prompted nametag with the spoken nametag as described above with reference to stages S1308, S1310, and S1312 of method 1300 in FIG. 13. In one embodiment, the user is prompted for all the names before the telematics unit 120 modifies any nametags in the nametag data file. In another embodiment, telematics unit 120 modifies the nametag data file for the prompted nametag after the user speaks the nametag and before prompting the user to speak the next nametag.

During stage S1406, the processor 122 in telematics 120 stores the revised nametag data file in the in-vehicle memory 128. In this manner, the audio data file in the nametag data file is replaced with the user-voice generated nametags, as the audio data file nametags in the nametag data file are spoken by the user in a voice command.

In one embodiment, the method 1400 revises a nametag data file at the telematics unit 120 for more than one language, as is understandable based on the parent application of this application.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of managing user nametags for a vehicle communications system, the method comprising:
   generating a nametag data file via at least one of a personal communication device or a personal computer;
   receiving a nametag transfer request at a call center from a source vehicle;
   determining a target vehicle based on the request;
   transferring the nametag data file from the at least one of the personal communication device or the personal computer to the call center;
   modifying, at the call center, the nametag data file to include a text data file, a phoneme set, and an audio data file;
   modifying the nametag data file to match an acoustic profile of the target vehicle; and
   transmitting the modified nametag data file to the target vehicle.

2. The method of claim 1, further comprising:
   storing the nametag data file at a telematics unit of the target vehicle.

3. The method of claim 1, further comprising:
   receiving, at a telematics unit of the target vehicle, the modified nametag data file;
   prompting a user of the target vehicle for an enunciated nametag upon receiving the modified nametag data file;
   modifying the nametag data file based on the enunciated nametag; and
   storing the modified nametag data file at the telematics unit.

4. The method of claim 1 wherein the nametag transfer request comprises a text data file, and wherein the modifying of the nametag data file to include the text data file, the phoneme set, and the audio data file comprises:
converting the text data file to a phoneme set operable with a speech recognition system in the target vehicle; and
converting the phoneme set to an audio data file operable with a speech recognition system in the target vehicle.

5. The method of claim 1 wherein the nametag transfer request comprises an audio data file, and wherein the modifying of the nametag data file to include the text data file, the phoneme set, and the audio data file comprises:
receiving an enunciated spelling of the nametag at a telematics unit of the target vehicle responsive to a prompt from the telematics unit;
generating, at the telematics unit, a text data file based on the received spelling of the nametag;
transmitting the text data file to the call center; and
generating, at the call center, a phoneme set operable with a speech recognition system in the target vehicle.

6. The method of claim 1 wherein the nametag transfer request comprises an audio data file, and wherein the modifying of the nametag data file to include the text data file, the phoneme set, and the audio data file comprises:
recognizing a spoken nametag;
generating a phoneme set based on the recognized nametag;
matching the phoneme set to a phoneme set in a dictionary text file; and
announcing the nametag generated from the matched phoneme set in the dictionary text file to prompt a user for confirmation.

7. The method of claim 1, further comprising:
storing source vehicle data in a database in the call center, wherein the source vehicle data includes a source identification, an acoustic profile of the source vehicle, and a source vehicle speech recognition identifier.

8. The method of claim 7 wherein the source vehicle data further includes the nametag data file.

9. The method of claim 7, further comprising receiving the source vehicle data from a telematics unit of the source vehicle.

10. The method of claim 7, further comprising:
initiating an Internet connection by one of a user or a dealership; and
receiving the source vehicle data via the Internet connection.

11. The method of claim 1 wherein the source vehicle includes a handset, and wherein the method further comprises:
storing source data in a database in the call center, wherein the source data includes a source identification, and a source speech recognition identifier.

12. The method of claim 1, further comprising:
storing target vehicle data in a database in the call center, wherein the target vehicle data includes a target vehicle identifier, the acoustic profile of the target vehicle and a target vehicle speech recognition identifier.

13. The method of claim 1 wherein the receiving of the nametag transfer request at the call center from the source vehicle comprises:
receiving a selection of the nametag data file to be transferred from the source vehicle to the target vehicle;
receiving a source identification; and
receiving a target vehicle identifier; and
wherein the determining of the target vehicle associated with the source vehicle based on the request comprises:
matching the target vehicle identifier with a target vehicle data in a database in the call center; and
retrieving an acoustic profile of the target vehicle and a target vehicle speech recognition identifier based on the matching.

14. The method of claim 1 wherein the modifying of the nametag data file is accomplished by:
receiving, at the call center, source identification from a telematics unit of the source vehicle;
matching the source identification with the source vehicle, the source identification associated with source data including at least one of an acoustic profile of the source vehicle, a source vehicle speech recognition identifier, or the nametag data file of the source vehicle;
retrieving at least one of the acoustic profile of the source vehicle, a source vehicle speech recognition identifier, or the nametag data file of the source vehicle from the source data;
determining if an acoustic profile of the target vehicle matches the acoustic profile of the source vehicle; and
removing or adding acoustic characteristics of the source vehicle from the nametag data file if the acoustic profile of the target vehicle does not match that of the source vehicle.

15. The method of claim 1, further comprising revising the nametag data file at a telematics unit of the target vehicle by:
storing, in the telematics unit, the modified nametag data file including an audio data file;
receiving a voice command from a user, the voice command including a spoken nametag;
retrieving the modified nametag data file in response to receiving the voice command and matching a phoneme set in the nametag data file with a phoneme set generated from the spoken nametag;
correlating the matched phoneme set with the audio data file from the nametag data file;
replacing the audio data file from the nametag data file with an audio data file of the spoken nametag; and
storing the audio data of the spoken nametag in the telematics unit.

16. The method of claim 1 wherein the modifying of the nametag data file is accomplished by:
receiving, at the call center, source identification with the nametag transfer request, the nametag transfer request further including a nametag data file including a text data file;
matching the source identification with source data stored at the call center, the source data including a source speech recognition identifier and a source nametag data file including a source text data file;
retrieving at least one of the source speech recognition identifier or the source text data file from the source data;
applying a text-to-speech processor code to the received nametag data file of the nametag transfer request, thereby generating an audio data file; and
adding acoustic characteristics of the target vehicle to the generated audio data file.

17. The method of claim 16 wherein the generating of the audio data file includes:
determining the gender of a user; and
one of i) if the user is male, generating a male audio data file, or ii) if the user is female, generating a female audio data file.

18. A system for managing user nametags for a vehicle communications system, the system comprising:
means for generating a nametag data file via at least one of a personal communication device or a personal computer;

means for receiving a nametag transfer request at a call center from a source vehicle;

means for determining a target vehicle based on the request;

means for transferring the nametag data file from the at least one of the personal communication device or the personal computer to the call center;

means for modifying, at the call center, the nametag data file to include a text data file, a phoneme set, and an audio data file;

means for modifying the nametag data file to match an acoustic profile of the target vehicle; and means for transmitting the modified nametag data file to the target vehicle.

19. A computer readable medium storing a computer program comprising:

computer readable code for generating a nametag data file via at least one of a personal communication device or a personal computer;

computer readable code for receiving a nametag transfer request at a call center from a source vehicle;

computer readable code for determining a target vehicle based on the request;

computer readable code for transferring the nametag data file from the at least one of the personal communication device or the personal computer to the call center;

computer readable code for modifying the nametag data file to include a text data file, a phoneme set, and an audio data file;

computer readable code for modifying the nametag data file to match an acoustic profile of the target vehicle;

computer readable code for transmitting the modified nametag data file to the target vehicle; and computer readable code for storing the nametag data file at a telematics unit of the target vehicle.

* * * * *